United States Patent [19]

Kubo et al.

[11] Patent Number: 5,064,473
[45] Date of Patent: Nov. 12, 1991

[54] FILLER FOR HEAT-SENSITIVE RECORDING PAPER AND PROCESS FOR PRODUCING THE SAME

[75] Inventors: Masao Kubo, Toyama; Akihiro Shiroishi, Tokyo; Ikuo Uno, Kobe; Takashi Nishiyama, Akou, all of Japan

[73] Assignees: Nissan Chemical Industries, Ltd., Tokyo; Shionogi & Co. Ltd., Osaka, both of Japan

[21] Appl. No.: 479,255

[22] Filed: Feb. 13, 1990

Related U.S. Application Data

[63] Continuation-in-part of Ser. No. 289,302, Dec. 23, 1988, abandoned.

[30] Foreign Application Priority Data

Dec. 26, 1987 [JP] Japan .................. 62-330686
Oct. 17, 1988 [JP] Japan .................. 63-259316

[51] Int. Cl.$^5$ .............................................. C01B 33/12
[52] U.S. Cl. ............................. 106/287.34; 423/339
[58] Field of Search ........................... 423/470, 339; 106/287.34

[56] References Cited

U.S. PATENT DOCUMENTS

| | | | |
|---|---|---|---|
| 1,235,552 | 8/1917 | Chappell | 423/470 |
| 2,780,522 | 2/1957 | Gloss et al. | 423/470 |
| 4,026,997 | 5/1977 | Schneider et al. | 423/470 |
| 4,509,064 | 4/1985 | Usni et al. | 106/492 |

FOREIGN PATENT DOCUMENTS

0135976 4/1985 European Pat. Off. .

OTHER PUBLICATIONS

Patent Abstracts of Japan, vol. 10, No. 204 (M-499) (2260) 17 Jul. 1986.
Patent Abstracts of Japan, vol. 11, No. 135 (M-585)(2582) 28 Apr. 1987.

*Primary Examiner*—Mark L. Bell
*Attorney, Agent, or Firm*—Birch, Stewart, Kolasch & Birch

[57] ABSTRACT

Disclosed herein is a filler for heat-sensitive recording paper which comprises amorphous silica obtained by reacting hydrosilicofluoric acid and/or an alkali salt thereof with an alkali (such as ammonia and dimethylamine). The filler has a solid acid strength ($pk_a$) of $+6.8$ to 3.3, and oil absorption value of 120 to 200 ml/100 g, a nitrogen adsorption specific surface area of 110 to 350 $m^2/g$ (by BET method), and a water vapor adsorption specific surface area of 200 to 300 $m^2/g$ (by BET method).

1 Claim, No Drawings

FILLER FOR HEAT-SENSITIVE RECORDING PAPER AND PROCESS FOR PRODUCING THE SAME

CROSS REFERENCE TO RELATED APPLICATION

This application is a continuation-in-part of copending application Ser. No. 07/289,302 filed on Dec. 23, 1988, now abandoned the entire contents of which are hereby incorporated by reference.

BACKGROUND OF THE INVENTION

1. Field of the Invention

The present invention relates to a filler for heat-sensitive recording paper and also to a process for producing the same. More particularly, it is concerned with an amorphous silica-based filler for heat-sensitive recording paper which has a high oil absorbancy and a low degree of base paper discoloration, and also with a process for producing said filler.

2. Description of the Prior Art

With the recent development and progress of office automation, new media, etc. in the information-oriented society, there is an increasing demand for a variety of recording papers for information-related equipment. Most noticeable among them is leuco dye-based heat-sensitive recording paper for facsimile and printers. It utilizes the color reaction which takes place when a colorless leuco dye and a phenol compound melt together on heating.

Heat-sensitive recording paper of this type has a disadvantage that the melt tends to stick to and accumulate on the thermal head of a printer at the time of color development. A known method to overcome this disadvantage is to incorporate the color forming layer of recording paper with a filler having a high oil absorbancy. A common example of such a filler is amorphous silica having a high oil absorbancy, as disclosed in, for example, Japanese Patent Laid-open No. 22794/1984. It has a $pk_a$ of $+3.3$ to $-3.0$, an oil absorption value of 130 to 160 ml/100 g, a nitrogen adsorption specific surface area of 35 to 75 m$^2$/g (by BET method), and a water vapor adsorption specific surface area of 210 to 250 m$^2$/g (by BET method). This silica filler hardly poses the above-mentioned problems.

This silica filler, however, has another disadvantage of discoloring the base of heat-sensitive recording paper. This discoloration occurs because the amorphous silica of high oil absorbancy, which is usually produced by decomposing alkali silicate by wet process in the presence of water, promotes the reaction of a leuco dye with a phenol compound on account of its high surface activity. This disadvantage is not completely eliminated even by the amorphous silica described in Japanese Patent Laid-open No. 22794/1984 mentioned above.

U.S. Pat. No. 4,509,064 discloses a filler for a heat-sensitive recording paper comprising finely divided amorphous silica having a BET specific surface area of 10 to 100 m$^2$/g and a bulk density of 0.14 to 0.30 g/cc, said finely divided amorphous silica having such a secondary particle size distribution that secondary particles having a size smaller than 4 microns, as measured by the centrifugal precipitation method, occupy at least 90% by weight of the total particles.

SUMMARY OF THE INVENTION

Accordingly, it is an object of the present invention to provide a filler for heat-sensitive recording paper which, unlike the above-mentioned conventional amorphous silica of high oil absorbancy, does not cause the heat-sensitive recording paper to foul the thermal head, nor does it discolor the base paper.

It is another object of the present invention to provide a process for producing such a silica filler.

According to the first aspect of the present invention, there is provided a filler for heat-sensitive recording paper which comprises amorphous silica obtained by reacting hydrosilicofluoric acid and/or an alkali salt thereof with an alkali. The silica filler for heat-sensitive recording paper is different in origin from the conventional silica filler for heat-sensitive recording paper which is prepared by wet process. The silica filler obtained by reacting hydrosilicofluoric acid and/or an alkali salt thereof with an alkali should preferably have high purity, a solid acid strength (abbreviated as $pk_a$) of $+6.8$ to $+3.3$, an oil absorption value of 120 to 200 ml/100 g, a nitrogen adsorption specific surface area of 110 to 350 m$^2$/g (by BET method), and a water vapor adsorption specific surface area of 200 to 300 m$^2$/g (by BET method). Such amorphous silica filler of high purity exhibits superior performance as a filler for heat-sensitive recording paper.

According to the second aspect of the present invention, there is provided a process for producing a filler for heat-sensitive recording paper which comprises reacting hydrosilicofluoric acid and/or an alkali salt thereof with an alkali and collecting the resulting amorphous silica as a filler for heat-sensitive recording paper. After the reaction, the resulting precipitates may be collected by filtration, washed, and aged (if necessary), and dried to yield the desired amorphous silica filler for heat-sensitive recording paper. The process of the present invention can give the silica filler having the abovesaid properties which are effective for heat-sensitive recording paper.

It is well known that hydrosilicofluoric acid yields, upon decomposition with an alkali, amorphous silica along with an alkali fluoride. See, for example, U.S. Pat. Nos. 1,235,552 and 2,780,522. However, no attempts have been made to use the amorphous silica obtained in such a manner as a filler for heat-sensitive recording paper. In addition, nothing was known about how to control the reaction to obtain the reaction product which has desired properties as a filler for heat-sensitive recording paper. After their intensive studies, the present inventors found that the amorphous silica obtained by reacting hydrosilicofluoric acid and/or an alkali salt thereof with an alkali satisfies the requirements for the filler used in the production of heat-sensitive recording paper.

The above and other objects, features and advantages of the present invention will be more apparent from the following description.

DETAILED DESCRIPTION OF THE INVENTION

According to the present invention, the amorphous silica filler for heat-sensitive recording paper is produced from hydrosilicofluoric acid and/or an alkali salt thereof. Examples of the alkali salt of hydrosilicofluoric acid include ammonium silicofluoride; dimethylammonium silicofluoride, diethanolammonium silicofluoride, and other organoamine salts; and sodium silicofluoride, potassium silicofluoride, and other alkali metal salts. They may be used alone or in combination with one another. These raw materials may contain hydrofluoric acid and/or salts thereof.

The hydrosilicofluoric acid and/or an alkali salt thereof that can be effectively used in the present invention may be obtained as a by-product in the production of phosphoric acid by wet process. The former may also be obtained by reacting natural or synthetic silica with hydrofluoric acid.

The hydrosilicofluoric acid and/or an alkali salt thereof is usually used in the form of aqueous solution. The aqueous solution is not specifically limited in concentration; but it should preferably be about 5% by weight or higher, more desirably about 10 to about 40% by weight.

The alkali that is used for the reaction with the hydrosilicofluoric acid and/or an alkali salt thereof includes, for example, ammonia, organic amines such as lower alkylamines (dimethylamine, etc.) and lower alkanolamine (diethanolamine, etc.), and alkali metal hydroxides (such as sodium hydroxide and potassium hydroxide). These alkalis are usually used in the form of aqueous solution, although ammonia may be used in the gaseous form. The aqueous solution of the alkali is not specifically limited in concentration; but it should preferably be about 3% by weight or higher, more preferably about 3 to about 20% by weight.

The following procedures can be used for the production of amorphous silica filler through the reaction of hydrosilicofluoric acid and/or an alkali salt thereof with an alkali.

(1) An aqueous solution of hydrosilicofluoric acid and/or an alkali salt thereof is added to an aqueous solution of an alkali.

(2) An aqueous solution of an alkali is added to an aqueous solution of hydrosilicofluoric acid and/or an alkali salt thereof.

(3) An aqueous solution of hydrosilicofluoric acid and/or an alkali salt thereof and an aqueous solution of an alkali are mixed all simultaneously.

The first procedure is suitable in the case where ammonia is used as the alkali. In this case, the reaction should be carried out at pH 7 to 13, preferably pH 9 to 12. The second procedure is effective in the case where lower alkyl amine is used as the alkali. In this case, the reaction should be carried out at pH 5 to 11, preferably pH 6 to 9. The third procedure should be carried out at pH 7 to 13, preferably pH 8 to 12 depending on the type of alkali used.

The reaction of hydrosilicofluoric acid and/or an alkali salt thereof with an alkali may be performed in the presence of a seed silica slurry which has previously been prepared. In this case, the seed silica slurry may be prepared by the above-mentioned procedure for the reaction of hydrosilicofluoric acid and/or an alkali salt thereof with an alkali.

The above-mentioned reaction should be performed at room temperature to 100° C., preferably 50° C. to 100° C. The reaction time is usually several minutes to 60 minutes.

The reaction of hydrosilicofluoric acid and/or an alkali salt thereof with an alkali should preferably be performed such that the molar ratio of total fluorine to total alkali is 1:1 to 1:1.5. In addition, the reaction should preferably be performed such that the reaction product contains 1 to 10% by weight of silica.

After the reaction, the reaction liquid is filtered or centrifuged so that the amorphous silica formed is separated from the aqueous solution of alkali fluoride. The separated silica may be washed, if necessary, with a dilute alkali solution such as ammonia water, followed by rinsing.

After rinsing, the silica cake may be dispersed into a slurry again for ageing with stirring. The ageing should be performed at room temperature to 70° C. for 30 to 180 minutes. Instead of ageing, the slurry may be adjusted to a desired pH with an alkali (such as sodium hydroxide) or an acid (such as sulfuric acid). After ageing or pH adjustment, the slurry is filtered or centrifuged for the separation of silica from the liquid. The separated silica may be washed with water, if necessary. The silica is finally dried in the usual way, such as spray drying, under normal pressure or in vacuo.

The thus obtained amorphous silica is crushed and classified, according to need, for shipment as a filler for heat-sensitive paper.

Incidentally, the aqueous solution of alkali fluoride separated in the above-mentioned steps may be recycled as such for the reaction or processed for the recovery of alkali fluoride.

The amorphous silica obtained by the above-mentioned process is used as a filler for heat-sensitive recording paper in the production of heat-sensitive recording paper. It can be used in the same way as the conventional filler.

More specifically, the silica filler is blended into a coating composition for heat-sensitive recording paper and the coating composition is applied on the surface of paper to prepare heat-sensitive recording paper. The coating composition may comprise a heat-sensitive dye such as Leuco dye, a developer such as bisphenol A and benzyl para-hydroxy benzoate, a sensitizer such as fatty amide (stearic acid amide etc.), a stabilizer such as metal salts of organic acids (zinc fatty ester, etc.) diphenyl compounds (tetrabromodiphenylether, etc.), sulfonic compounds (amides of sulfonic acids, esters of sulfonic acids, etc.) and phenol compounds, a filler, and a binder such as polyvinyl alcohol, hydroxyethyl cellulose and styren-maleic anhydride copolymer. In the present invention, the silica described above is used as the filler. The blending amounts of the above components are not limited. Preferably, the dye may be present in an amount of about 1% to about 15% by weight, the developer may be present in an amount of about 1% to about 30% by weight, the sensitizer, stabilizer and filler may be present in an amount of about 1% to about 20% by weight, respectively, and the binder may be present in an amount of about 1% to about 30% by weight. The composition may be prepared by blending the components into water. The thus obtained composition is applied to a base paper with a thickness of about 1 $\mu$m to about 15 $\mu$m.

The amorphous silica filler should have the following properties:

$pk_a$: $+6.8 \sim +3.3$.

Oil absorption value: $120 \sim 200$ ml/100 g.

Nitrogen adsorption specific surface area: $110 \sim 350$ m$^2$/g (by BET method).

Water vapor adsorption specific surface area: $200 \sim 300$ m$^2$/g (by BET method).

The average particle size of the silica filler may preferably be less than 5 $\mu$m, more preferably be 0.1 to 5 $\mu$m.

The amorphous silica as specified above does not cause the heat-sensitive recording paper to foul the thermal head, nor does it discolor the base paper.

The invention is now described in more detail with reference to Examples and Comparative Examples, which are not intended to restrict the scope of the invention.

Meanwhile, the solid acid strength ($pk_a$), oil absorption, and specific surface area given in this specification were measured by the following methods.

(1) Solid acid strength ($pk_a$)

In 3 to 5 test tubes is placed 0.1 g each of sample (dried at 105° C. for 2 hours). To each of the test tubes is added benzene and then 1 to 2 drops of a proper $pk_a$ indicator (0.1% solution in benzene). The color change of the indicator indicates the acid strength. (Refer to "Shokubai Kogaku Koza" (Catalyst Engineering Series), vol. 4, 1975, pp. 169–170.)

(2) Oil absorption

Measured according to JIS K-5101.

(3) Nitrogen adsorption specific surface area

Measured according to BET method. Molecular sectional area: 16.2 $Å^2$ (Refer to "Shokubai Kogaku Koza" (Catalyst Engineering Series), vol. 4, 1975, pp. 50–60.)

(4) Water vapor adsorption specific surface area

Measured according to BET method. Molecular sectional area: 10.6 $Å^2$ (Refer to "Shokubai Kogaku Koza" (Catalyst Engineering Series), vol. 4, 1975, pp. 50–60.)

EXAMPLE 1

In a 5-liter polyethylene vessel was placed 2380 g of 25 wt % ammonia water. To the vessel was added, with stirring, 1620 g of 40 wt % aqueous solution of hydrosilicofluoric acid over 20 minutes. The reactants were kept at 60° to 70° C. while the reaction proceeded. During the reactions, the pH of the solution declined from 11.5 to 9.3. The resulting precipitates were filtered off and washed with dilute ammonia water (pH 10) and then with distilled water.

The cake was dispersed again into water (at 30° C.) to yield a slurry. The slurry was aged with stirring for 30 minutes. The solids were filtered off and dried at 100° to 120° C. for 130 minutes, followed by crushing and classification. Thus there was obtained 270 g of silica filler for heat-sensitive recording paper in the form of fine powder. This silica filler has the following physical properties.

(a) $pk_a$: +4.8 to +4.0.
(b) Oil absorption (ml/100 g): 136.
(c) Nitrogen adsorption specific surface area ($m^2/g$): 122.
(d) Water vapor adsorption specific surface area ($m^2/g$): 262.

EXAMPLE 2

In a 5-liter polyethylene vessel was placed 1190 g of 25 wt % ammonia water. To the vessel was added, with stirring, 810 g of 40 wt % aqueous solution of hydrosilicofluoric acid over 2 minutes. The reactants were kept at 60° to 70° C. while the reaction proceeded. Thus there was obtained a seed silica slurry (pH 9.2). To this seed silica slurry was added 1190 g of 25 wt % ammonia water. The slurry had a pH value of 11.

To this slurry was added 810 g of 40 wt % aqueous solution of hydrosilicofluoric acid over 30 minutes. The reactants were kept at 60° to 70° C. while the reaction proceeded. The resulting slurry had a pH value of 9.2. The solids in the slurry were filtered off and the cake was washed with distilled water and dried at 100° to 120° C. for 20 minutes, followed by crushing and classification. Thus there was obtained 270 g of silica filler for heat-sensitive recording paper in the form of fine powder. This silica filler has the following physical properties.

(a) $pk_a$: +4.8 to +4.0.
(b) Oil absorption (ml/100 g): 135.
(c) Nitrogen adsorption specific surface area ($m^2/g$): 166.
(d) Water vapor adsorption specific surface area ($m^2/g$): 240.

EXAMPLE 3

A seed slurry was prepared in the same manner as in Example 2. To this slurry were added simultaneously 1190 g of 25 wt % ammoina water and 810 g of 40 wt % aqueous solution of hydrosilicofluoric acid over 20 minutes. The reactants were kept at 60° to 70° C. while the reaction proceeded. The resulting slurry had a pH value of 9.2. The solids in the slurry were filtered off and washed in the same manner as in Example 2.

The cake was dispersed again into water to yield a slurry. The slurry was subjected to spray-drying in hot air at 250° C., followed by crushing and classification. Thus there was obtained 270 g of silica filler for heat-sensitive recording paper in the form of fine powder. This silica filler has the following physical properties.

(a) $pk_a$: +4.8 to +4.0.
(b) Oil absorption (ml/100 g): 134.
(c) Nitrogen adsorption specific surface area ($m^2/g$): 149.
(d) Water vapor adsorption specific surface area ($m^2/g$): 241.

EXAMPLE 4

A slurry was prepared in the same manner as in Example 2. The solids in the slurry were filtered off and the resulting cake was washed with distilled water. The cake was dried in vacuo at 20 mmHg (absolute), followed by crushing and classification. Thus there was obtained 270 g of silica filler for heat-sensitive recording paper in the form of fine powder. This silica filler has the following physical properties.

(a) $pk_a$: +4.8 to +4.0.
(b) Oil absorption (ml/100 g): 135.
(c) Nitrogen adsorption specific surface area ($m^2/g$): 151.
(d) Water vapor adsorption specific surface area ($m^2/g$): 252.

EXAMPLE 5

A slurry was prepared in the same manner as in Example 2. The solids in the slurry were filtered off and the resulting cake was washed with distilled water. The cake was dried at 100° to 120° C. for 30 minutes, followed by crushing and classification. Thus there was obtained 270 g of silica filler for heat-sensitive recording paper in the form of fine powder. This silica filler has the following physical properties.

(a) $pk_a$: +4.8 to +4.0.
(b) Oil absorption (ml/100 g): 141.
(c) Nitrogen adsorption specific surface area ($m^2/g$): 196.
(d) Water vapor adsorption specific surface area ($m^2/g$): 240.

EXAMPLE 6

In a 100-liter stainless steel vessel was placed 22 kg of 25 wt % ammonia water. To the vessel was added, with stirring, 15 kg of 40 wt % aqueous solution of hydrosilicofluoric acid over 2 minutes to give a seed silica slurry. To this seed silica slurry were added sequentially 22 kg of 25 wt % ammonia water and 15 kg of 40 wt % aqueous solution of hydrosilicofluoric acid over 30 minutes. The solids in the slurry were filtered off and the cake was washed with pure water. The cake was formed into small masses. The masses were dried in a hot-air drier at 140° C., followed by crushing and classification. Thus there was obtained 5 kg of silica filler for heat-sensitive recording paper in the form of fine powder. This silica filler has the following physical properties.

(a) $pk_a$: +4.8 to +4.0.
(b) Oil absorption (ml/100 g): 131.
(c) Nitrogen adsorption specific surface area ($m^2/g$): 273.
(d) Water vapor adsorption specific surface area ($m^2/g$): 264.

EXAMPLE 7

A slurry was prepared in the same manner as in Example 6. The solids in the slurry were filtered off and the resulting cake was washed with pure water. The cake was dispersed again into water to give a slurry. The slurry was dried in a spray drier with superheated air at 500° C., followed by crushing and classification. Thus there was obtained 5 kg of silica filler for heat-sensitive recording paper in the form of fine powder. This silica filler has the following physical properties.

(a) $pk_a$: +3.3 to +4.0.
(b) Oil absorption (ml/100 g): 134.
(c) Nitrogen adsorption specific surface area ($m^2/g$): 290.
(d) Water vapor adsorption specific surface area ($m^2/g$): 272.

EXAMPLE 8

The same procedure as in Example 6 was repeated to give a slurry. The solids in the slurry were separated and washed with pure water. Thus there was obtained 20 kg of wet silica (containing 25 wt % of silica) filler for heat-sensitive recording paper.

COMPARATIVE EXAMPLE 1

Sodium silicate solution (No. 3) was diluted with water to give 5 liters of 7.85% aqueous solution of sodium silicate. The aqueous solution was heated to 90° C. with stirring. To the aqueous solution was added 141 ml of 56% sulfuric acid. After standing for 30 minutes, 172 ml of 56% sulfuric acid was added again. 30 minutes later, the precipitates were filtered off, washed with water, and dried. The dried solids were crushed and classified. Thus there was obtained 360 g of silica filler for heat-sensitive recording paper in the form of fine powder. This silica filler has the following physical properties.

(a) $pk_a$: −3.0 to −5.6.
(b) Oil absorption (ml/100 g): 220.
(c) Nitrogen adsorption specific surface area ($m^2/g$): 220.
(d) Water vapor adsorption specific surface area ($m^2/g$): 219.

COMPARATIVE EXAMPLE 2

Sodium silicate solution (No. 3) was diluted with water to give 5 liters of 8.8% aqueous solution of sodium silicate. The aqueous solution was heated to 90° C. with stirring. To the aqueous solution was added 351 ml of 56% sulfuric acid. After standing for 30 minutes, 50 g of ammonium sulfate was added. The resulting precipitates were treated in the same manner as in Comparative Example 1. Thus there was obtained 440 g of silica filler for heat-sensitive recording paper in the form of fine powder. This silica filler has the following physical properties.

(a) $pk_a$: +1.5 to −3.0.
(b) Oil absorption (ml/100 g): 140.
(c) Nitrogen adsorption specific surface area ($m^2/g$): 85.
(d) Water vapor adsorption specific surface area ($m^2/g$): 160.

To evaluate the silica fillers obtained in the above-mentioned Examples and Comparative Examples, experiments were carried out with heat-sensitive recording paper prepared according to the formulation shown in Table 1.

TABLE 1

|  | 1 part by weight | 5 parts by weight |
| --- | --- | --- |
| Solution A | Dye: "S-205", made by Yamada Kagaku Co., Ltd. | 5% aq. solution of polyvinyl alcohol (PVA) |
| Solution B | Developer: bisphenol A | 5% aq. solution of polyvinyl alcohol (PVA) |
| Solution C | Sensitizer: stearic acid amide | 5% aq. solution of polyvinyl alcohol (PVA) |
| Solution D | Filler: silica | 5% aq. solution of polyvinyl alcohol (PVA) |

Solutions A, B, and C were prepared by crushing and mixing the components in a ball mill for 24 hours. Solution D was prepared by dispersing and mixing the silica filler obtained in Examples and Comparative Examples with 5 wt % aqueous solution of PVA for 15 minutes using a mixing machine. Thus prepared solutions A, B, C and D were mixed together by stirring for 15 minutes in the ratio of 1:5:3:3 by weight. Thus there were obtained 15 kinds of coating solutions for heat-sensitive recording paper, each containing silica filler of different kind. The coating solution was evenly applied to commercial wood-free paper (60 to 70 g/$m^2$) using a 10-mil bar coater to make heat-sensitive paper.

EVALUATION TEST

The heat-sensitive recording paper prepared as mentioned above was tested for physical properties in the following manner to evaluate the quality required for heat-sensitive recording paper.

ITEMS, MEASURING METHODS AND CRITERIA FOR EVALUATION (A) Discoloration of Base Paper The discoloration of base paper was measured using a Hunter whiteness tester (with filter A) (made by Toyo Seiki Co., Ltd.) 24 hours after the application of the coating solution. The discoloration was visually evaluated according to the criteria shown in Table 2. For accurate measurement, the speciment was placed on 3 sheets of wood-free paper, with the coated side upward.

TABLE 2

| Criteria | Readings of Hunter whiteness tester | Visual inspection |
| --- | --- | --- |
| No discoloration | 78 and above | Good |
| Slight discoloration, but usable | 75~77 | Fair |
| Discoloration, unusable | lower than 75 | Poor |

(B) Sensitivity of Color Development

After the application of the coating solution, the resulting heat-sensitive recording paper was dried at room temperature. A thermal plate (85° C.) was pressed against the opposite side of the coating surface for 5 seconds, and the density of the color developed was measured with a Hunter whiteness tester (with filter A). The sensitivity of color development was visually evaluated according to the criteria shown in Table 3. For accurate measurement, the specimen was placed on 3 sheets of wood-free paper, with the coated side upward.

TABLE 3

| Criteria | Readings of Hunter whiteness tester | Visual inspection |
| --- | --- | --- |
| High color density, good for practical use | lower than 25 | Good |
| Lower color density, no good for practical use | 25 and above | Poor |

(C) Sticking

After the application of the coating solution, the resulting heat-sensitive recording paper was dried at room temperature. With the coated side covered by a piece of filter paper (No. 2), the specimen was pressed against an impulse sealer (Model 300, made by Fuji Seisakusho Co., Ltd.) for 5 seconds (with the dial set at 5). The state of the filter paper was visually inspected according to the criteria shown in Table 4.

TABLE 4

| Criteria | Visual inspection |
| --- | --- |
| Very little sticking | Good |
| Little sticking, but usable | Fair |
| Recording paper sticks to filter paper | Poor |

(D) Overall evaluation

The overall evaluation was made according to the following criteria judging from the discoloration of base paper, the sensitivity of color development, and the degree of sticking.

Good: No problems in practical use.
Fair: With a few drawbacks, although usable.
Poor: Unusable The results are shown in Table 5.

TABLE 5

| Example | Solid acid strength ($pk_a$) | Oil absorption (ml/100 g) | Nitrogen adsorption specific surface area ($m^2/g$) | Water vapor adsorption specific surface area ($m^2/g$) | Discoloration of base paper | Sensitivity of color development | Degree of sticking | Overall evaluation |
| --- | --- | --- | --- | --- | --- | --- | --- | --- |
| 1 | +4.8~+4.0 | 136 | 122 | 262 | 76.9 (fair) | 17.0 (good) | Good | Fair |
| 2 | +4.8~+4.0 | 135 | 166 | 240 | 77.4 (fair) | 17.4 (good) | Good | Fair |
| 3 | +4.8~+4.0 | 134 | 149 | 241 | 75.5 (fair) | 16.8 (good) | Good | Fair |
| 4 | +4.8~+4.0 | 135 | 151 | 252 | 79.7 (good) | 22.1 (good) | Good | Good |
| 5 | +4.8~+4.0 | 141 | 196 | 240 | 77.7 (fair) | 20.4 (good) | Good | Fair |
| 6 | +4.8~+4.0 | 131 | 273 | 264 | 78.5 (good) | 22.8 (good) | Good | Good |
| 7 | +3.3~+4.0 | 134 | 290 | 272 | 78.7 (good) | 22.7 (good) | Good | Good |
| 8 | — | — | — | — | 78.1 (good) | 19.7 (good) | Fair | Good |
| 1* | −3.0~−5.6 | 220 | 220 | 219 | 66.5 (poor) | 25.9 (poor) | Good | Poor |
| 2* | +1.5~−3.0 | 140 | 85 | 160 | 72.0 (poor) | 26.0 (poor) | Good | Poor |

*Comparative Examples
The results of visual inspection for the discoloration of base paper and the sensitivity of color development are given in parentheses.

It is noted from Table 5 that the heat-sensitive recording paper incorporated with the filler of this invention suffers from the discoloration of base paper only a little, has a high sensitivity of color development, and fouls the thermal head only a little. Therefore, it is of great practical use. In other words, the present invention provides a filler useful for heat-sensitive recording paper free of disadvantages involved in the conventional ones. In addition, the process of the present invention permits one to produce such a filler in an easy way with certainty.

What is claimed is:

1. A coating composition for heat-sensitive recording paper which comprises a heat-sensitive dye, a binder and an amorphous silica filler obtained by reacting hydrosilicofluoric acid and/or an alkali salt thereof with an alkali and having a solid acid strength ($pk_a$) of +6.8 to +3.3, an oil absorption value of 120 to 200 ml/100 g, a nitrogen adsorption specific surface area of 110 to 350 $m^2/g$ (by BET method), and a water vapor adsorption specific surface area of 200 to 300 $m^2/g$ (by BET method).

* * * * *